US008966621B1

(12) United States Patent
Johansson et al.

(10) Patent No.: US 8,966,621 B1
(45) Date of Patent: Feb. 24, 2015

(54) OUT-OF-BAND AUTHENTICATION OF E-MAIL MESSAGES

(75) Inventors: Jesper M. Johansson, Duvall, WA (US);
Justin C. Crites, Seattle, WA (US);
Robert Hanson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 577 days.

(21) Appl. No.: 12/974,945

(22) Filed: Dec. 21, 2010

(51) Int. Cl.
*G06F 11/00* (2006.01)
*G06F 12/14* (2006.01)
*G06F 12/16* (2006.01)
*G08B 23/00* (2006.01)

(52) U.S. Cl.
USPC .................................. 726/22; 726/26; 726/30

(58) Field of Classification Search
CPC ....... H04L 9/32; H04L 9/3236; H04L 9/3247; H04L 9/3263; H04L 63/08; H04L 63/12; H04L 63/126; G06F 21/60; G06F 21/64; G06F 21/606
USPC ............................................... 726/22, 26, 30
See application file for complete search history.

(56) References Cited

U.S. PATENT DOCUMENTS

| 6,640,301 | B1 * | 10/2003 | Ng .................................. 713/156 |
| 8,341,023 | B2 * | 12/2012 | Benisti et al. ................ 705/26.1 |
| 2009/0164506 | A1 * | 6/2009 | Barley et al. .................. 707/102 |
| 2011/0271349 | A1 * | 11/2011 | Kaplan ........................... 726/26 |

FOREIGN PATENT DOCUMENTS

EP   1898595 A1 *  3/2008

OTHER PUBLICATIONS

A Sender-Centric Approach to Detecting Phishing Emails; Sanchez et al, IEEE, Dec. 14-16, 2012.*

* cited by examiner

*Primary Examiner* — Luu Pham
*Assistant Examiner* — Jahangir Kabir
(74) *Attorney, Agent, or Firm* — Lee & Hayes, PLLC (57) ABSTRACT

Technologies are described herein for providing out-of-band authentication of an e-mail message. A recipient of an e-mail message purporting to be from an organization forwards the e-mail message or submits its content to that organization for authentication. The authenticity of the e-mail message is determined based on authentication data, such as outgoing message logs or authentication keys, maintained at the source of the e-mail message. Upon authenticating the e-mail message, the recipient is informed of the authenticity of the e-mail message.

25 Claims, 6 Drawing Sheets

OUT-OF-BAND AUTHENTICATION OF E-MAIL MESSAGES

BACKGROUND

"Phishing" is the process by which a perpetrator fraudulently attempts to acquire user identifiable and/or sensitive information. such as user names, passwords, credit card numbers, social security numbers, and the like, through an electronic communication, such as an e-mail message. The e-mail message may purport to be from a company or organization with which the recipient has a relationship, and may direct the recipient to reply to the message with the sensitive information or click on an embedded link that takes the recipient to a fake website masquerading as the legitimate website of the organization. There the recipient may be prompted to enter their sensitive information, such as user name, password, etc., which may be recorded and later used by the perpetrator of the phishing scheme to defraud the recipient and/or the organization.

Banks, financial service companies, online transaction or payment processors, online merchants, social media sites, and their customers may be frequent targets of such phishing e-mails. The phishing e-mails may be formatted in such a way that it is difficult for the recipient to determine its authenticity, even upon close inspection. For example, the phishing e-mail may be a copy of a legitimate e-mail message sent by the organization with all of the text, terms, and logos intact. The origin e-mail address of the phishing e-mail may be "spoofed" to hide the actual identity of the sender, and the displayed uniform resource locator ("URL") for any links embedded in the message may be misrepresented so that the actual target websites are not apparent or discoverable.

Technologies for prevention of origin address spoofing and securing e-mail content, such as Sender Policy Framework ("SPF"), Secure/Multipurpose Internet Mail Extensions ("S/MIME"), and DomainKeys Identified Mail ("DKIM"), may provide some protection against phishing attacks. However, such protection technologies may require support for the associated frameworks and/or protocols in the recipient's e-mail client program and/or the e-mail transport system, and may not be widely implemented. Further, because these types of technologies are "in-band," i.e. rely on content or data embedded the phishing e-mail itself, these technologies may be vulnerable to similar spoofs and misrepresentations.

It is with respect to these and other considerations that the disclosure made herein is presented.

DETAILED DESCRIPTION

The following detailed description is directed to technologies for providing out-of-band authentication of an e-mail message. Utilizing the technologies described herein, a recipient of an e-mail message purporting to be from an organization may forward the message or the content therein directly to that organization for authentication. The organization may then authenticate the e-mail message using authentication data, such as outgoing message logs or authentication keys, stored at the organization and respond to the recipient with an indication of the authenticity of the e-mail message. Authenticating the e-mail message at the source allows the organization to keep the authentication data private and not rely solely on information embedded in outgoing e-mail messages.

The technologies described herein provide for an "out-of-band" approach to e-mail authentication that may utilize context clues from the e-mail message, such as the from-address, the message body content, or user input, to determine the claimed source of the message, but relies on a user-initiated or programmatic verification directly with the claimed source organization through an external channel. This out-of-band approach to e-mail authentication makes spoofing of the authentication mechanism(s) very difficult. It will be appreciated that the out-of-band authentication methods described herein may also be utilized as an alternative to or in conjunction with other, in-band methods, such as DKIM, SPF, S/MIME, or the like, that rely on the content of the e-mail message to verify the messages authenticity. By allowing a recipient to authenticate a suspicious e-mail message before the recipient replies with the requested information or clicks on embedded links, incidents of phishing attacks and frauds may be reduced.

It should be appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, cellular telephone devices, electronic-book readers, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Figure 1:
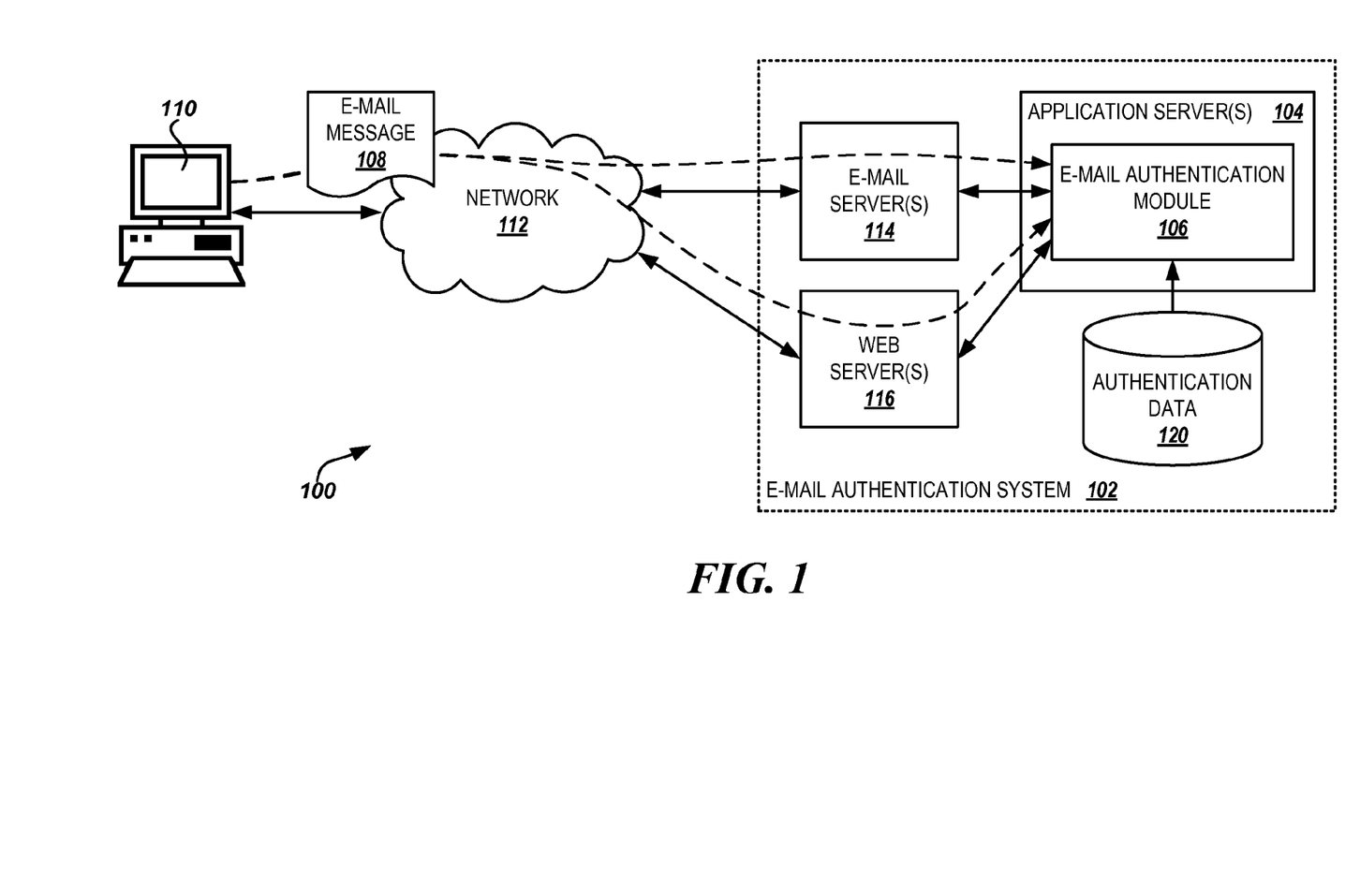
FIG. 1 is a system diagram showing aspects of an illustrative operating environment for providing out-of-band authentication of an e-mail message, including several software and hardware components provided by embodiments presented herein.

FIG. 1 and the following description are intended to provide a brief, general description of a suitable computing environment in which the embodiments described herein may be implemented. In particular, FIG. 1 is a system diagram that shows an illustrative operating environment 100 including several software components for implementing methods for providing out-of-band authentication of an e-mail message, according to embodiments provided herein. The environment 100 includes an e-mail authentication system 102.

The e-mail authentication system 102 may be implemented and maintained by an organization that sends e-mail messages to customers that may include information regarding transactions or accounts of the customer, such as a bank, a financial service company, an online transaction or payment processor, an online merchant, a social media website, or the like. Alternatively, the e-mail authentication system 102 may be implemented by a provider of e-mail services, such as an Internet service provider ("ISP") or an e-mail application hosting company, which provides e-mail services to organizations like those described above. The e-mail authentication system 102 provides facilities that allow recipients of an e-mail message purporting to be from the organization to authenticate the e-mail message. In a further embodiment, the e-mail authentication system 102 may be implemented by a third-party service provider that provides message authentication services to other organizations. E-mail messages sent by or on behalf of the other organizations may first be routed through the e-mail authentication system 102 to allow the messages to be mutated, logged, or otherwise processed to provide the out-of-band authentication services in a manner described herein.

The e-mail authentication system 102 may include a number of application servers 104 that provide various e-mail authentication services and other e-mail services to the organization. The application servers 104 may execute a number of modules in order to provide the services. The modules may execute on a single application server 104 or in parallel across multiple application servers in the e-mail authentication system 102. In addition, each module may consist of a number of subcomponents executing on different application servers 104 or other computing devices in the e-mail authentication system 102. The modules may be implemented as software, hardware, or any combination of the two.

In one embodiment, an e-mail authentication module 106 executes on the application servers 104. The e-mail authentication module 106 is configured to authenticate the content of an e-mail message 108 received from a recipient and inform the recipient of the messages authenticity. The e-mail authentication module 106 may receive the e-mail message 108 from a recipient computer 110 over a network 112. The e-mail message 108 may include a message header containing the information identifying the origin of the message, such as an origin e-mail address ("from-address"), one or more recipient e-mail addresses ("to-addresses"), a subject for the message, a unique identifier for the message, or the like. The e-mail message 108 may further include a message body containing the content of the message. The content may include text, HTML, XML, attachments, or other content in multipurpose Internet mail extensions ("MIME") attachments, for example.

The recipient computer 110 may be a personal computer ("PC"), such as a desktop workstation, laptop, or notebook; a personal digital assistant ("PDA"); a wireless telephone device; an electronic-book reader; a game console; a set-top box; a consumer electronics device; a remote server computer; or any other computing device capable of connecting to the network 112. The network 112 may be a local-area network ("LAN"), a wide-area network ("WAN"), the Internet, or any other networking topology known in the art that connects the recipient computer 110 to the e-mail authentication system 102.

According to one embodiment, the e-mail authentication module 106 receives the e-mail message 108 through one or more e-mail servers 114 in the e-mail authentication system 102. The e-mail servers 114 may be configured to receive e-mail messages 108 forwarded to an authentication e-mail address monitored by the organization. The authentication e-mail address may be defined such that it is easy to remember and relates the purpose of the address in a meaningful way, such as "verify@companyname.com" or "didwesendit@companyname.com." The authentication e-mail address may also be based on an Internet-wide standard established for e-mail authentication, such as "verify" at the domain name of the organization.

A recipient of an e-mail message 108 purporting to be from the organization may utilize an e-mail client program executing on the recipient computer 110 to forward the e-mail message to the authentication e-mail address of the organization for authentication. According to one embodiment, the authentication e-mail address is not referenced in the content of the e-mail message as a link or provided as a reply address to outgoing e-mail messages, in order to prevent spoofing of the authentication e-mail address and subversion of the authentication mechanism.

According to another embodiment, the e-mail authentication module 106 receives the e-mail message 108 through one or more Web servers 116 in the e-mail authentication system 102. The Web servers 116 may implement an authentication website or other online application that allows customers to submit the content of suspect e-mail messages 108 to the organization for authentication. A recipient of an e-mail message 108 purporting to be from the organization may utilize a browser application executing on the recipient computer 110 to access the authentication website and copy and paste the content of the e-mail message from their e-mail client program into a text field or other control on the website. The recipient may then submit the pasted content of the e-mail message 108 for authentication.

As in the case of the authentication e-mail address, the Web address or URL of the authentication website may be an easy-to-remember address, such as "http://verify.companyname.com" or "http://companyname.com/didwesendit." In one embodiment, the Web address of the authentication website is not embedded as a link in the content of the outgoing e-mail messages in order to prevent spoofing of the authentication mechanism by the actual sender of the e-mail.

Figure 2:
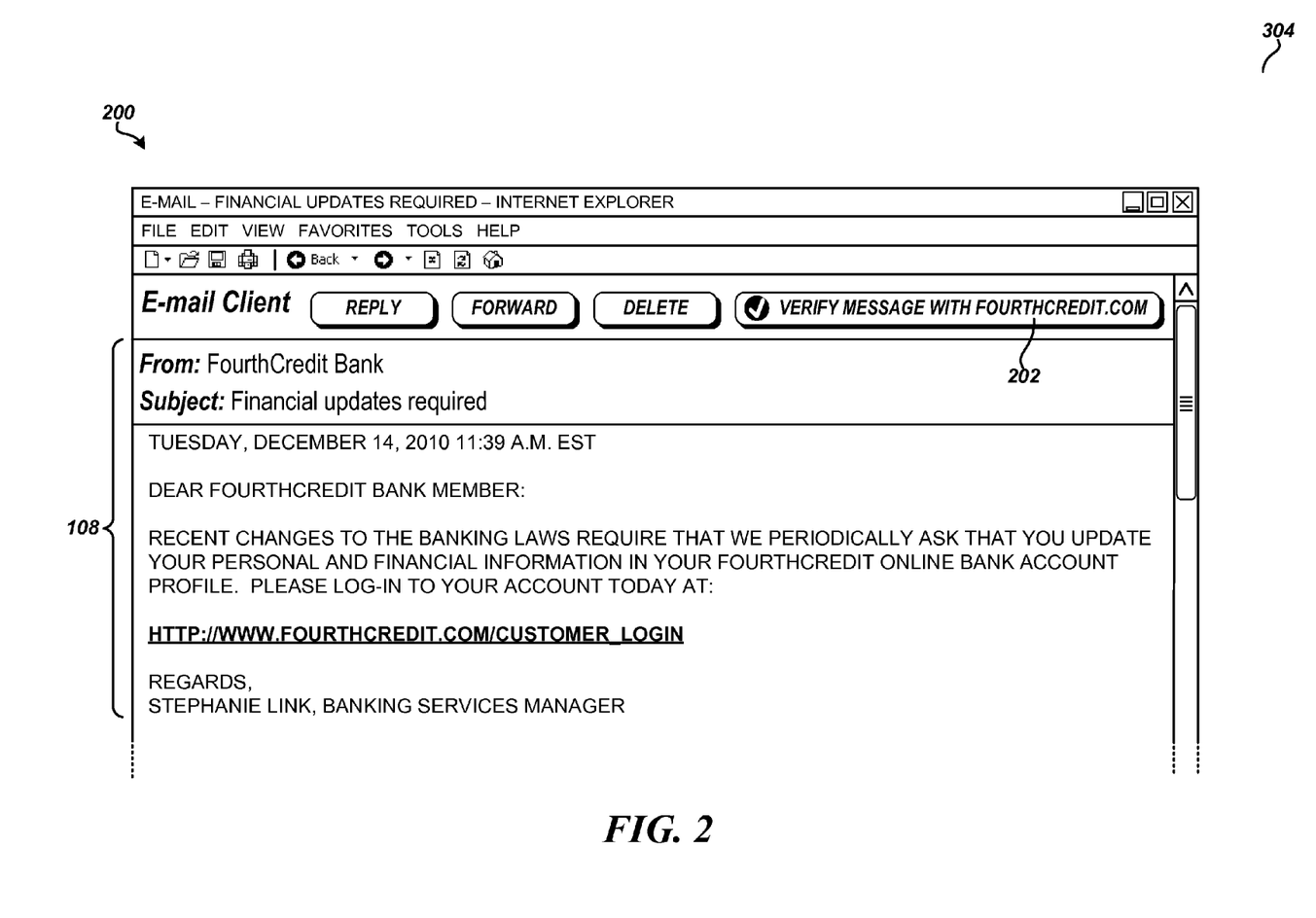
FIG. 2 is a screen diagram showing an exemplary user interface of an e-mail client program implementing a user control for performing out-of-band authentication of an e-mail message, according to embodiments described herein.

In a further embodiment, the e-mail authentication module 106 may implement a message verification protocol that provides a number of channels for the submission of e-mail messages 108 for verification, including receiving e-mail messages forwarded to the authentication e-mail address, messages submitted through the authentication website, and messages submitted through other Web services or application programming interfaces ("APIs") defined by the message verification protocol. Mail user agents ("MUAs"), such as the e-mail client program executing on the recipient computer 110, may implement a programmatic method of out-of-band e-mail message verification based on the defined message verification protocol. For example, as shown in FIG. 2, an e-mail client program may present a control, such a pushbutton 202, in the program's user interface 200 that allows a user to submit a received e-mail message 108 to the e-mail authentication module 106 for verification of its authenticity.

The e-mail client program may determine the organization purporting to be the sender of the e-mail message 108 from the content or context of the message, and configure the pushbutton 202 or other control to submit the message to the e-mail authentication module 106 through one of the channels defined by the message verification protocol when the pushbutton is selected by the user. For example, the e-mail client program may submit the e-mail message 108 for verification by forwarding the message to the standard authentication e-mail address for that organization, by submitting the content of the message through an authentication website for the organization, or by submitting the message through other Web services or APIs implemented by the e-mail authentication module 106 of the organization according to the message verification protocol.

According to embodiments, the pushbutton 202 or other control implemented in the e-mail client program may operate out-of-band, i.e. does not rely on data or code embedded in the e-mail message 108 to trigger the button or configure the submission channel, in order to prevent spoofing of the authentication mechanism by the actual sender of the e-mail message. In another embodiment, the e-mail client program shows the determined source organization of the message to the user, as further shown in the pushbutton 202 in FIG. 2, before the out-of-band message verification process is initiated. This may provide further information to the user that the message is being verified with the correct organization through the programmatic process implemented by the e-mail client program. If multiple source organizations are implied by the content or context of the e-mail message 108, the e-mail client program may allow the user to choose the correct organization with which to authenticate the message, or it may submit the e-mail message to the multiple organizations simultaneously to verify the message opportunistically. It will be appreciated that the user interface 200 of the e-mail client program may implement different user interface components and/or controls for showing the determined source organization to the user and for initiating the out-of-band verification process with the source organization beyond those shown in FIG. 2 and described herein. It is intended for this application to include all such implementations.

Upon receiving the e-mail message 108 from the recipient computer 110, the e-mail authentication module 106 verifies that the message was sent by the organization, using a methodology such as those described below in regard to FIGS. 4 and 5. The e-mail authentication module 106 may utilize authentication data 120, such as logs of messages sent by the organization or authentication keys, to authenticate the e-mail message 108, as will be further described below. The authentication data 120 may be stored in a database or other data storage system in the e-mail authentication system 102.

Once the authenticity of the received e-mail message 108 has been established, the e-mail authentication module 106 informs the user of the results of authentication. For example, if the e-mail message 108 for authentication was received via the e-mail servers 114, the e-mail authentication module 106 may send a reply message to the recipient indicating whether the message was authentic. If the e-mail message 108 was submitted for authentication through the authentication website executing on the Web servers 116, the e-mail authentication module 106 may provide a near-instant response to the recipient submitting the content of the message through the authentication website of the authenticity of the e-mail message. It will be appreciated that other methods of informing the recipient that the e-mail message 108 is or is not authentic may be utilized by the e-mail authentication module 106. According to a further embodiment, if the e-mail message 108 is determined not be authentic, the e-mail authentication module 106 may also archive the e-mail message for later analysis and/or further action by the organization.

Figure 3:
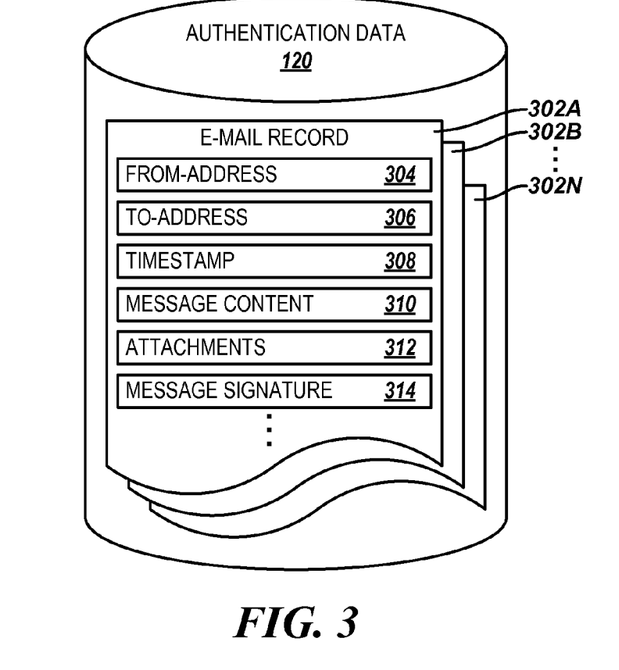
FIG. 3 is a data structure diagram illustrating a number of data elements maintained in authentication data, according to embodiments presented herein.

FIG. 3 is a data structure diagram showing a number of data elements stored in a data structure. It will be appreciated by one skilled in the art that the data structure shown in the figure may represent a record stored in a database table, an object stored in a computer memory, a programmatic structure, or any other data container commonly known in the art. Each data element included in the data structure may represent one or more fields or columns of a database record, one or more attributes of an object, one or more member variables of a programmatic structure, or any other unit of data of a data structure commonly known in the art. The implementation is a matter of choice, and may depend on the technology, performance, and other requirements of the computing system upon which the data structures are implemented.

Specifically, FIG. 3 shows one example of data elements that may be stored in the authentication data 120. As described above, the authentication data 120 may contain data utilized by the e-mail authentication module 106 to verify that the e-mail message 108 received from the recipient computer 110 was sent by the organization. According to one embodiment, the authentication data 120 contains a log of e-mail messages sent by or on behalf of the organization. For example, the authentication data 120 may contain an e-mail record 302A-302N (referred to herein generally as e-mail record 302) corresponding to each e-mail message 108 sent by or for the organization.

The e-mail record 302 may contain basic information from the corresponding e-mail message 108, including the from-address 304 indicating the origin of the e-mail, the to-address 306 indicating the intended recipient(s), and a timestamp 308 indicating when the message was sent. The e-mail authentication module 106 may utilize these values to locate a corresponding e-mail record 302 for a received e-mail message 108 in order to authenticate the message. In one embodiment, the e-mail record 302 may also contain the original message content 310 from the corresponding e-mail message 108. The e-mail authentication module 106 may utilize the original message content 310 to ensure that an e-mail message 108 being authenticated has not been altered nor had content added to it, as will be described below in regard to FIG. 4. The e-mail record 302 may further contain any attachments 312 that were included in the corresponding e-mail message 108. This may allow the e-mail authentication module 106 to detect an unauthorized attachment contained in an otherwise authentic e-mail message 108, for example. In one embodiment, the attachments 312 data element in the e-mail record 302 may simply indicate a number of attachments that were included in the corresponding e-mail message 108.

Alternatively or additionally, the e-mail record 302 may contain a message signature 314. The message signature 314 may contain a representative value of the original content of the corresponding e-mail message 108. For example, the message signature 314 may contain a hash value generated from the content. Storing the message signature 314 instead of the original message content 310 in the e-mail record 302 may decrease storage requirements in the authentication data 120 as well as increase the processing speed of authenticating the content of an e-mail message 108 received for authentication. It will be appreciated that the e-mail record 302 may contain additional data elements beyond those shown in FIG. 3 and described above that represent attributes of the corresponding outgoing e-mail messages 108 sent by or on behalf of the organization. In addition, the authentication data 120 may contain other data utilized by the e-mail authentication module 106 and/or other modules of the e-mail authentication system 102 to authenticate received e-mail messages 108, as will be described further below.

Figure 4:
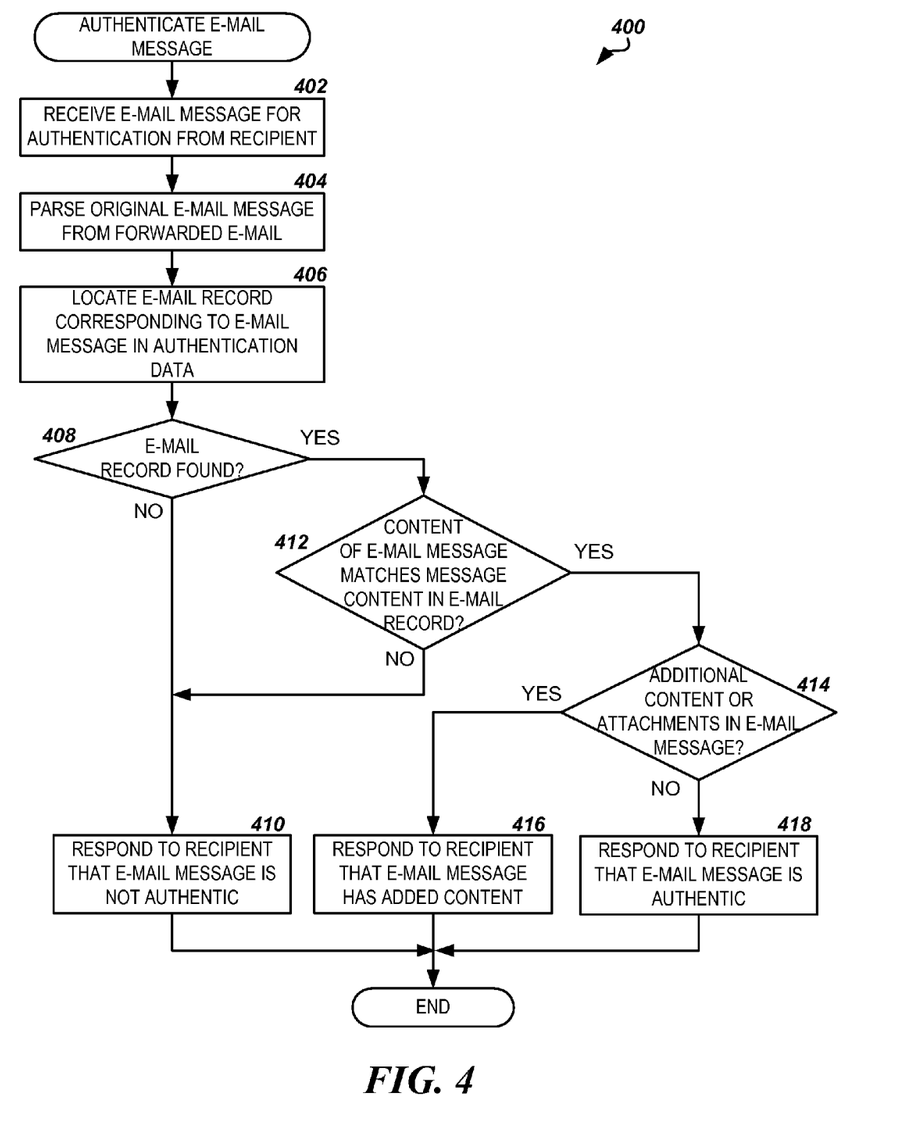
FIG. 4 is a flow diagram showing one method for providing out-of-band authentication of an e-mail message, according to embodiments described herein.
Figure 5:
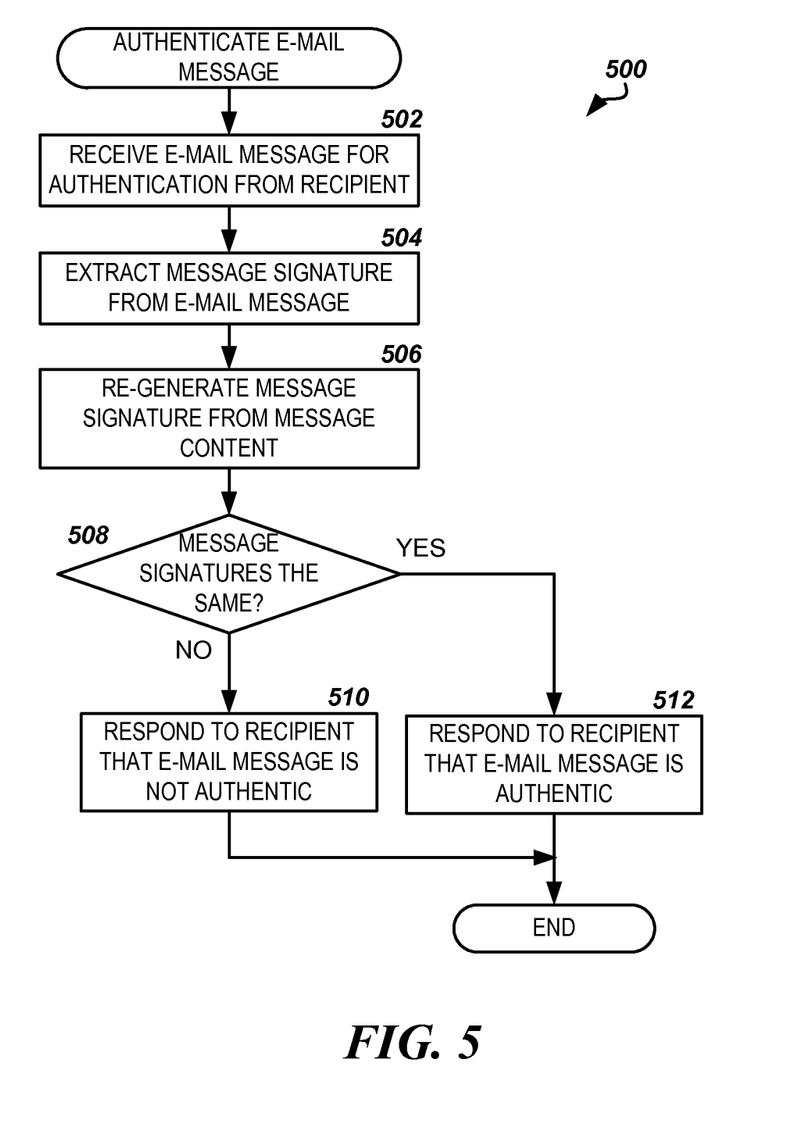
FIG. 5 is a flow diagram showing another method for providing out-of-band authentication of an e-mail message, according to embodiments described herein.

Turning now to FIGS. 4 and 5, additional details will be provided regarding the embodiments presented herein for providing out-of-band authentication of an e-mail message. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 4 illustrates a routine 400 for authenticating an e-mail message 108 received from a recipient, according to embodiments described herein. In one embodiment, the routine 400 is performed by the e-mail authentication module 106, as described above in regard to FIG. 1. It will be appreciated that the routine 400 may also be performed by other modules or components executing on the application servers 104 in the e-mail authentication system 102, or by any combination of modules and components. The routine 400 begins at operation 402, where the e-mail authentication module 106 receives the e-mail message 108 for authentication from the recipient computer 110. As described above in regard to FIG. 1, the e-mail authentication module 106 may receive the e-mail message 108 through the e-mail servers 114 configured to receive messages forwarded to the authentication e-mail address, according to one embodiment. In alternative embodiments, the e-mail authentication module 106 may receive the e-mail message 108 from the Web servers hosting the authentication website or from some other source.

From operation 402, the routine 400 proceeds to operation 404, where the e-mail authentication module 106 parses the original e-mail message 108 from the forwarded e-mail. As further described above, the e-mail message 108 purporting to be from the organization may be forwarded to the authentication e-mail address by the recipient using the e-mail client program executing on the recipient computer 110. The original e-mail message 108 may be forwarded as an attachment or "in-line," depending on the e-mail client program. The e-mail authentication module 106 parses the forwarded e-mail to determine the portions that represent the original e-mail message 108. The e-mail authentication module 106 may attempt to parse both the header and message content of the original e-mail message 108 from the forwarded e-mail.

It will be appreciated that the e-mail authentication module 106 may utilize knowledge of the various forwarding mechanisms, such as indentation, delineation, delimiters, or the like, of various e-mail client programs to parse the original e-mail message 108 from the forwarded e-mail. In one embodiment, the original e-mail message 108 may contain specific content delimiters around the message content added to the e-mail message went sent. The e-mail authentication module 106 may utilize these content delimiters to identify the message content in the original e-mail message 108 as well as determine if additional content has been added to the e-mail message, as will be described below.

The routine 400 proceeds from operation 404 to operation 406, where the e-mail authentication module 106 attempts to locate a corresponding e-mail record 302 in the authentication data 120 for the e-mail message 108. The e-mail record 302 may be located in the authentication data 120 based the from-address 304, the to-address 306 and/or the timestamp 308 parsed from the e-mail message 108, for example. At operation 408, if an e-mail record 302 corresponding to the e-mail message 108 is not found, the routine 400 proceeds to operation 410, where the e-mail authentication module 106 responds to the recipient indicating that the e-mail message 108 is not authentic. For example, the e-mail authentication module 106 may respond to the forwarded e-mail with a message indicating that the original e-mail message 108 received by the recipient is not authentic. From operation 410, the routine 400 ends.

If, at operation 408, an e-mail record 302 corresponding to the e-mail message 108 is found, the routine 400 may proceed to operation 412, where the e-mail authentication module 106 determines if the content of the e-mail message 108 matches the original content of the e-mail message sent by the organization by comparing data from the message header and/or content of the e-mail message with the data stored in the located e-mail record 302, according to embodiments. In one embodiment, the e-mail authentication module 106 compares the content of the e-mail message 108 parsed from the forwarded e-mail to the original message content 310 from the corresponding e-mail record 302. In another embodiment, the e-mail authentication module 106 hashes or encodes the content of the e-mail message 108 parsed from the forwarded e-mail to compute a message signature, and then compares the newly computed message signature to the message signature 314 stored in the corresponding e-mail record 302. It will be appreciated that hashing the content of the e-mail message 108 and comparing the hash value to the previously stored message signature 314 may allow for a more efficient authentication process, but may not permit enumeration of the actual changes made to the content of the message.

In additional embodiments, the e-mail authentication module 106 may further compare the headers and/or other portions of the e-mail message 108 to attributes stored in the corresponding e-mail record 302 to determine if the e-mail message is authentic. If it is determined that the content of the e-mail message 108 does not match the original message content of the e-mail message as sent, the routine 400 proceeds from operation 412 to operation 410, where the e-mail authentication module 106 responds to the recipient indicating that the e-mail message 108 is not authentic, as described above. According to a further embodiment, the e-mail authentication module 106 may also instruct the recipient regarding a secure message center website or other location where the recipient may go to read the original message content 310 corresponding to the e-mail message 108. From operation 410, the routine 400 ends.

If the e-mail authentication module 106 determines that the content of the e-mail message 108 matches the original message content of the e-mail message as sent, the routine 400 proceeds from operation 412 to operation 414, where the e-mail authentication module 106 determines if additional content outside the original message content of the e-mail message 108 has been added. For example, the e-mail authentication module 106 may check the attachments 312 stored in the e-mail record 302 against any attachments in the received e-mail message 108 to determine if attachments that were not originally included in the e-mail message were later added, potentially with malicious intent. The e-mail authentication module 106 may also check if content or data were embedded in the e-mail message 108 outside of the content delimiters discussed above in regard to operation 404.

If additional content has been added to the message, then the routine 400 proceeds from operation 414 to operation 416, where the e-mail authentication module 106 responds to the recipient that the received e-mail message 108 has additional content added after the original e-mail message was sent. For example, the e-mail authentication module 106 may respond to the forwarded e-mail with an indication that the original e-mail message 108 received by the recipient has the added content and instructing the recipient to visit a secure message center website or other location to read the original message content 310. If, however, additional content has not been added to the message, then the routine 400 proceeds from operation 414 to operation 418, where the e-mail authentication module 106 responds to the recipient indicating that the received e-mail message 108 is authentic. From operations 416 or 418, the routine 400 ends.

FIG. 5 illustrates another routine 500 for authenticating e-mail messages 108, according to embodiments described herein. In one embodiment, the routine 500 is performed by the e-mail authentication module 106, as described above in regard to FIG. 1. It will be appreciated that the routine 500 may also be performed by other modules or components executing on the application servers 104 in the e-mail authentication system 102, or by any combination of modules and components. The routine 500 begins at operation 502, where the e-mail authentication module 106 receives the e-mail message 108 for authentication from the recipient computer 110. As described above in regard to FIG. 1, the e-mail authentication module 106 may receive the e-mail message 108 through the Web servers 116, according to one embodiment. For example, the recipient of the e-mail message 108 may copy and paste the content of the e-mail message 108 from their e-mail client program to a text box or other control in the authentication website hosted on the Web servers 116 and submit the pasted content for authentication. In alternative embodiments, the e-mail authentication module 106 may receive the e-mail message 108 through the e-mail servers 114 or from another source.

From operation 502, the routine 500 proceeds to operation 504, where the e-mail authentication module 106 extracts a message signature embedded in the e-mail message 108 at the time the message was sent. According to one embodiment, a message signature may be generated from a private key and/or a hash of the original message content and embedded in all outgoing e-mail messages 108 sent from or on behalf of the organization. The message signature may be included in a header of the e-mail message 108, or encoded in text or in an image and embedded in content of the message, for example. Upon receiving the e-mail message 108, the e-mail authentication module 106 locates the encoded message signature embedded in the message and decodes the original signature value.

The routine 500 proceeds from operation 504 to operation 506, where the e-mail authentication module 106 re-generates the message signature for the e-mail message 108, using the private key and/or hash of the message content or the received e-mail message in the same manner as when the message was originally sent. The routine 500 then proceeds to operation 508, where the message signature extracted from the e-mail message 108 and the re-generated message signature are compared. If the two message signatures are not the same, then the operation proceeds from operation 508 to operation 510 where the e-mail authentication module 106 informs the recipient that the e-mail message 108 is not authentic. For example, the e-mail authentication module 106 may transmit a message through the authentication application to the recipient indicating that the message is not authentic. If, however, the two message signatures are the same, then the routine proceeds from operation 508 to operation 512, where the e-mail authentication module 106 informs the recipient that the e-mail message 108 is authentic. From operations 510 or 512, the routine 500 ends.

Figure 6:
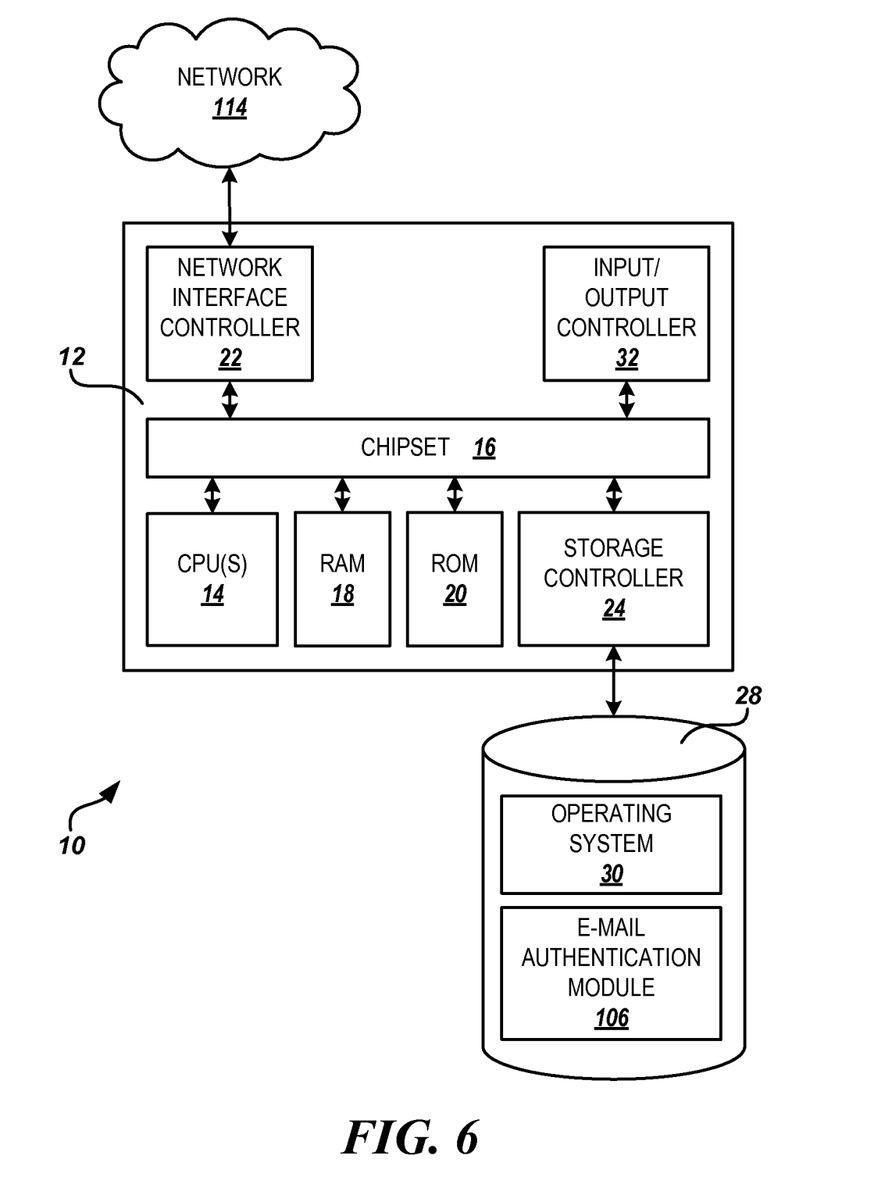
FIG. 6 is a computer architecture diagram showing an illustrative computer hardware architecture for computing devices described in embodiments presented herein.

FIG. 6 shows an example computer architecture 10 for a computer 12 capable of executing the software components described herein for providing out-of-band authentication of an e-mail message, in the manner presented above. The computer architecture 10 shown in FIG. 6 illustrates a conventional server computer, workstation, desktop computer, laptop, network appliance, personal digital assistant ("PDA"), electronic book reader, digital cellular phone, or other computing device, and may be utilized to execute any aspects of the software components presented herein described as executing on the application servers 104, the recipient computer 110, or other computing platform.

The computer 12 includes a baseboard, or "motherboard," which is a printed circuit board to which a multitude of components or devices may be connected by way of a system bus or other electrical communication paths. In one illustrative embodiment, one or more central processing units ("CPUs") 14 operate in conjunction with a chipset 16. The CPUs 14 are standard programmable processors that perform arithmetic and logical operations necessary for the operation of the computer 12.

The CPUs 14 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 16 provides an interface between the CPUs 14 and the remainder of the components and devices on the baseboard. The chipset 16 may provide an interface to a random access memory ("RAM") 18, used as the main memory in the computer 12. The chipset 16 may further provide an interface to a computer-readable storage medium such as a read-only memory ("ROM") 20 or non-volatile RAM ("NVRAM") for storing basic routines that that help to startup the computer 12 and to transfer information between the various components and devices. The ROM 20 or NVRAM may also store other software components necessary for the operation of the computer 12 in accordance with the embodiments described herein.

According to various embodiments, the computer 12 may operate in a networked environment using logical connections to remote computing devices and computer systems through the network 112, such as a local-area network ("LAN"), a wide-area network ("WAN"), the Internet, or any other networking topology known in the art that connects the computer 12 to remote computers. The chipset 16 includes functionality for providing network connectivity through a network interface controller ("NIC") 22, such as a gigabit Ethernet adapter. The NIC 22 is capable of connecting the computer 12 to other computing devices over the network 112, such as other application servers 104, the recipient computer 110, a data storage system in the e-mail authentication system 102, and the like. It should be appreciated that any number of NICs 22 may be present in the computer 12, connecting the computer to other types of networks and remote computer systems.

The computer 12 may be connected to a mass storage device 28 that provides non-volatile storage for the computer. The mass storage device 28 may store system programs, application programs, other program modules, and data, which are described in greater detail herein. The mass storage device 28 may be connected to the computer 12 through a storage controller 24 connected to the chipset 16. The mass storage device 28 may consist of one or more physical storage units. The storage controller 24 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 12 may store data on the mass storage device 28 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 28 is characterized as primary or secondary storage, and the like. For example, the computer 12 may store information to the mass storage device 28 by issuing instructions through the storage controller 24 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 12 may further read information from the mass storage device 28 by detecting the physical states or characteristics of one or more particular locations within the physical storage units.

In addition to the mass storage device 28 described above, the computer 12 may have access to other computer-readable media to store and retrieve information, such as program modules, data structures, or other data. It should be appreciated by those skilled in the art that computer-readable media may be any available media that can be accessed by the computer 12, including computer-readable storage media and communications media. Communications media includes transitory signals. Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 28 may store an operating system 30 utilized to control the operation of the computer 12. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized.

The mass storage device 28 may store other system or application programs and data utilized by the computer 12, such as the e-mail authentication module 106 described above in regard to FIG. 1. In one embodiment, the mass storage device 28 or other computer-readable storage media may be encoded with computer-executable instructions that, when loaded into the computer 12, may transform the computer from a general-purpose computing system into a special-purpose computer capable of implementing the embodiments described herein. These computer-executable instructions transform the computer 12 by specifying how the CPUs 14 transition between states, as described above. According to one embodiment, the computer 12 may have access to computer-readable storage media storing computer-executable instructions that, when executed by the computer, perform the routines 400 or 500 for providing out-of-band authentication of an e-mail message, as described above in regard to FIGS. 4 and 5.

The computer 12 may also include an input/output controller 32 for receiving and processing input from a number of input devices, such as a keyboard, the mouse, a touchpad, a touch screen, an electronic stylus, or other type of input device. Similarly, the input/output controller 32 may provide output to a display, such as a computer monitor, a flat-panel display, a digital projector, a printer, a plotter, or other type of output device. It will be appreciated that the computer 12 may not include all of the components shown in FIG. 6, may include other components that are not explicitly shown in FIG. 6, or may utilize an architecture completely different than that shown in FIG. 6.

Based on the foregoing, it should be appreciated that technologies for providing out-of-band authentication of an e-mail message are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A method for authenticating e-mail messages, the method comprising executing instructions on one or more computers to perform the operations of:

receiving, by one or more computers, an e-mail message from a recipient by at least one of (a) parsing a forwarded e-mail sent from the recipient to an authentication e-mail address to obtain the e-mail message, or (b) receiving a content of the e-mail message submitted by the recipient utilizing an authentication application;

locating, by one or more computers, a matching e-mail record corresponding to the e-mail message in a log of outgoing e-mails;

in response to a determination that a matching e-mail record is not found in the log, informing, by one or more computers, the recipient that the e-mail message is not authentic;

in response to a determination that a matching e-mail record is found in the log, determining, by one or more computers, that the content of the e-mail message contained in a message body of the e-mail message and specified by content delimiters matches an original message content based on the matching e-mail record found in the log;

in response to determining that the content of the e-mail message does not match the original message content based on the matching e-mail record found in the log, informing, by one or more computers, the recipient that the e-mail message is not authentic, and informing the recipient of a location where the recipient can electronically access the original e-mail message for viewing;

in response to determining that the content of the e-mail message matches the original message content based on the matching e-mail record, determining, by one or more computers, that additional content has been added to the e-mail message outside of the content delimiters;

in response to determining that additional content has been added to the e-mail message, informing, by one or more computers, the recipient that the e-mail message has additional content added; and in response to determining that additional content has not been added to the e-mail message, informing, by one or more computers, the recipient that the e-mail message is authentic.

2. The method of claim 1, wherein locating the matching e-mail record corresponding to the e-mail message in the log of outgoing e-mails comprises searching the log for one or more of a from-address, to-address, or timestamp from the e-mail message.

3. The method of claim 1, wherein determining that the content of the e-mail message matches the original message content based on the matching e-mail record comprises comparing the content of the e-mail message to the original message content stored in the matching e-mail record.

4. The method of claim 1, wherein determining that the content of the e-mail message matches the original message content based on the matching e-mail record comprises generating a first message signature from the content of the e-mail message and comparing the first message signature to a second message signature stored in the matching e-mail record.

5. The method of claim 1, further comprising archiving the email message for analysis in response to the determination that a matching e-mail record is not found in the log.

6. The method of claim 1, wherein the authentication e-mail address is not referenced in the content of the e-mail message as a link.

7. The method of claim 1, wherein the authentication e-mail address is not provided as a reply address to outgoing e-mail messages.

8. A system for authenticating e-mail messages, the system comprising:

one or more application servers comprising at least one hardware processor; and an e-mail authentication module executing on the application servers and configured to locate a matching e-mail record corresponding to an e-mail message in a log of outgoing e-mails, wherein the e-mail message is received from a recipient through at least one of (a) parsing a forwarded e-mail sent from the recipient to an authentication e-mail address to obtain the e-mail message, or (b) receiving a content of the e-mail message submitted by the recipient utilizing an authentication application, in response to a determination that a matching e-mail record is not found in the log, inform the recipient that the e-mail message is not authentic, in response to a determination that a matching e-mail record is found in the log, determine that a content of the e-mail message contained in a message body of the e-mail message and specified by content delimiters matches an original message content based on the matching e-mail record found in the log, in response to determining that the content of the e-mail message does not match the original message content based on the matching e-mail record found in the log, inform the recipient that the e-mail message is not authentic, and inform the recipient of a location where the recipient can electronically access the e-mail original message for viewing, in response to determining that the content of the e-mail message matches the original message content based on the matching e-mail record, determine that additional content has been added to the e-mail message outside of the content delimiters, in response to determining that additional content has been added to the e-mail message, inform the recipient that the e-mail message has additional content added, and in response to determining that additional content has not been added to the e-mail message, inform the recipient that the e-mail message is authentic.

9. The system of claim 8, wherein determining that the content of the e-mail message matches the original message content of the e-mail message further comprises:

comparing the content of the e-mail message to the original message content stored in the matching e-mail record.

10. The system of claim 8, wherein locating the matching e-mail record corresponding to the e-mail message in the log of outgoing e-mails comprises searching the log for one or more of a from-address, to-address, or timestamp from the e-mail message.

11. The system of claim 8, wherein determining that the content of the e-mail message matches the original message content of the e-mail message further comprises:

generating a first message signature from the content of the e-mail message; and comparing the first message signature to a second message signature stored in the matching e-mail record.

12. The system of claim 8, wherein the e-mail authentication module is further configured to archive the email message for analysis in response to the determination that a matching e-mail record is not found in the log.

13. The system of claim 8, wherein the authentication e-mail address is not referenced in the content of the e-mail message as a link or provided as a reply address to outgoing e-mail messages.

14. A non-transitory computer-readable storage medium having computer executable instructions stored thereon which, when executed by a computer, cause the computer to:

locate a matching e-mail record corresponding to an e-mail message in a log of outgoing e-mails, wherein the e-mail message is received from a recipient through at least one of (a) parsing a forwarded e-mail sent from the recipient to an authentication e-mail address to obtain the e-mail message, or (b) receiving a content of the e-mail message submitted by the recipient utilizing an authentication application;

in response to a determination that a matching e-mail record is not found in the log, inform the recipient that the e-mail message is not authentic;

in response to a determination that a matching e-mail record is found in the log, determine that the content of the e-mail message contained in a message body of the e-mail message and specified by content delimiters matches an original message content based on the matching e-mail record found in the log;

in response to determining that the content of the e-mail message does not match the original message content based on the matching e-mail record found in the log, inform the recipient that the e-mail message is not authentic, and inform the recipient of a location where the recipient can electronically access the original e-mail message for viewing;

in response to determining that the content of the e-mail message matches the original message content based on the matching e-mail record, determine that additional content has been added to the e-mail message outside of the content delimiters;

in response to determining that additional content has been added to the e-mail message, inform the recipient that the e-mail message has additional content added; and     in response to determining that additional content has not been added to the e-mail message, inform the recipient that the e-mail message is authentic.

15. The computer-readable storage medium of claim 14, wherein locating the matching e-mail record corresponding to the received e-mail message in the log comprises searching the log for one or more of a from-address, to-address, or timestamp from the received e-mail message.

16. The computer-readable storage medium of claim 14, wherein determining that the content of the received e-mail message matches the original message content based on the matching e-mail record comprises comparing the content of the received e-mail message to the original message content stored in the matching e-mail record.

17. The computer-readable storage medium of claim 14, wherein determining that the content of the received e-mail message matches the original message content based on the matching e-mail record comprises generating a first message signature from the content of the received e-mail message and comparing the first message signature to a second message signature stored in the matching e-mail record.

18. The computer-readable storage medium of claim 14, wherein the authentication e-mail address is not referenced in the content of the e-mail message as a link or provided as a reply address to outgoing e-mail messages.

19. The computer-readable storage medium of claim 14, having further computer executable instructions stored thereon which, when executed by the computer, cause the computer to archive the email message for analysis in response to the determination that a matching e-mail record is not found in the log.

20. An apparatus comprising:
    a hardware processor; and
    a computer-readable storage medium having computer executable instructions stored thereon which, when executed by the processor, cause the processor to     locate a matching e-mail record corresponding to an e-mail message in a log of outgoing e-mails, wherein the e-mail message is received from a recipient through at least one of (a) parsing a forwarded e-mail sent from the recipient to an authentication e-mail address to obtain the e-mail message, or (b) receiving a content of the e-mail message submitted by the recipient utilizing an authentication application,     in response to a determination that a matching e-mail record is not found in the log, inform the recipient that the e-mail message is not authentic,     in response to a determination that a matching e-mail record is found in the log, determine that the content of the e-mail message contained in a message body of the e-mail message and specified by content delimiters matches an original message content based on the matching e-mail record found in the log,     in response to determining that the content of the e-mail message does not match the original message content based on the matching e-mail record found in the log, inform the recipient that the e-mail message is not authentic, and inform the recipient of a location where the recipient can electronically access the original e-mail message for viewing,     in response to determining that the content of the e-mail message matches the original message content based on the matching e-mail record, determine that additional content has been added to the e-mail message outside of the content delimiters,     in response to determining that additional content has been added to the e-mail message, inform the recipient that the e-mail message has additional content added, and     in response to determining that additional content has not been added to the e-mail message, inform the recipient that the e-mail message is authentic.

21. The apparatus of claim 20, wherein locating the matching e-mail record corresponding to the received e-mail message in the log comprises searching the log for one or more of a from-address, to-address, or timestamp from the received e-mail message.

22. The apparatus of claim 20, wherein determining that the content of the received e-mail message matches the original message content based on the matching e-mail record comprises comparing the content of the received e-mail message to the original message content stored in the matching e-mail record.

23. The apparatus of claim 20, wherein determining that the content of the received e-mail message matches the original message content based on the matching e-mail record comprises generating a first message signature from the content of the received e-mail message and comparing the first message signature to a second message signature stored in the matching e-mail record.

24. The apparatus of claim 20, wherein the authentication e-mail address is not referenced in the content of the e-mail message as a link or provided as a reply address to outgoing e-mail messages.

25. The apparatus of claim 20, wherein the computer-readable storage medium has further computer executable instructions stored thereon which, when executed by the processor, cause the processor to archive the email message for analysis in response to the determination that a matching e-mail record is not found in the log.

* * * * *